(12) United States Patent
Coppens et al.

(10) Patent No.: US 9,382,504 B2
(45) Date of Patent: Jul. 5, 2016

(54) COMPOSITION AND METHOD TO PROVIDE STAIN RELEASE AND STAIN REPELLENCY PROPERTIES TO SUBSTRATES

(71) Applicant: 3M INNOVATIVE PROPERTIES COMPANY, St. Paul, MN (US)

(72) Inventors: Dirk M. Coppens, Beveren (BE); Leonardus A. M. Doelen, Moenchengladbach (DE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 13/938,711

(22) Filed: Jul. 10, 2013

(65) Prior Publication Data

US 2013/0296216 A1    Nov. 7, 2013

Related U.S. Application Data

(62) Division of application No. 13/133,093, filed as application No. PCT/US2009/068026 on Dec. 15, 2009, now abandoned.

(30) Foreign Application Priority Data

Dec. 19, 2008  (GB) .................................. 0823139.1

(51) Int. Cl.
| | |
|---|---|
| *C11D 3/00* | (2006.01) |
| *C04B 41/00* | (2006.01) |
| *C04B 41/48* | (2006.01) |
| *C09D 5/16* | (2006.01) |
| *B05D 5/08* | (2006.01) |

(52) U.S. Cl.
CPC ............ *C11D 3/0036* (2013.01); *C04B 41/009* (2013.01); *C04B 41/4846* (2013.01); *C09D 5/1637* (2013.01); *B05D 5/083* (2013.01); *B05D 2203/30* (2013.01)

(58) Field of Classification Search
None
See application file for complete search history.

(56) References Cited

U.S. PATENT DOCUMENTS

| | | |
|---|---|---|
| 3,597,359 A | 8/1971 | Smith |
| 5,219,490 A | 6/1993 | Basu |
| 5,256,318 A | 10/1993 | Masutani |
| 5,725,789 A | 3/1998 | Huber |
| 5,798,415 A | 8/1998 | Corpart |
| 6,638,998 B2 | 10/2003 | Zhao |
| 6,740,173 B1 | 5/2004 | Pouyfaucon |
| 7,049,379 B2 | 5/2006 | Jariwala |
| 7,078,456 B2 | 7/2006 | Jariwala' |
| 7,592,489 B2 | 9/2009 | Miller |
| 2002/0142097 A1 | 10/2002 | Giacobbi |
| 2007/0066780 A1 | 3/2007 | Udea |
| 2007/0219331 A1 | 9/2007 | Ishikawa |
| 2011/0086971 A1 | 4/2011 | Udea |

FOREIGN PATENT DOCUMENTS

| | | |
|---|---|---|
| CN | 1078257 | 11/1993 |
| EP | 0 087 799 B1 | 10/1986 |
| EP | 1 568 721 A1 | 8/2005 |
| EP | 1 640 387 A1 | 3/2006 |
| EP | 1 265 827 B1 | 7/2006 |
| EP | 1 743 910 A1 | 1/2007 |
| JP | 11-077677 | 3/1999 |
| JP | 2003-306391 | 10/2003 |
| WO | WO 90/02487 | 3/1990 |
| WO | WO 02-04383 A1 | 1/2002 |
| WO | WO 2006/028854 | 3/2006 |
| WO | WO 2007-127267 A2 | 11/2007 |
| WO | WO 2008/057353 | 5/2008 |

OTHER PUBLICATIONS

AATCC Standard Test Method No. 118-1983, "Oil Repellency: Hydrocarbon Resistance Test", 1 page.
Extended European Search Report for European Patent Application No. 09837877.1 dated Apr. 27, 2015.

*Primary Examiner* — Clinton Brooks

(57) ABSTRACT

The present invention provides a composition for treatment, the composition comprising a fluorinated compound and a phosphate ester having at least one hydrocarbon residue having at least 6 carbon atoms. There is further provided a method of treatment applying the composition to a substrate.

13 Claims, No Drawings

COMPOSITION AND METHOD TO PROVIDE STAIN RELEASE AND STAIN REPELLENCY PROPERTIES TO SUBSTRATES

CROSS REFERENCE TO RELATED APPLICATIONS

This application is a Divisional Application of U.S. application Ser. No. 13/133,093, filed as a national stage application under 35 U.S.C. 371 of PCT/US2009/068026, filed Dec. 15, 2009, which claims priority to GB Application No. 0823139.1, filed Dec. 19, 2008, the disclosures of which are incorporated by reference in their entirety herein.

BACKGROUND

The present invention relates to a composition for treatment for providing stain release or stain repellence properties to substrates, in particular hard surfaces such as natural and man-made stone. In a particular aspect, the composition comprises a fluorinated compound and a phosphate ester.

Hard surface substrates, in particular natural or man-made stones are frequently used in the building industry and outdoor environment in a decorative way. When left unprotected, hard surfaces may loose their original appearance from exposure to weathering and soil. This problem is particularly noticeable with increasing porosity of the substrate. In order to protect hard surfaces they are often sealed with a film-forming resin, such as an epoxy or urethane product. These coating materials are often quite expensive and may undesirably alter the appearance of the coated substrate. Such coatings also seal the product completely, preventing or greatly reducing the escape of moisture from the coated substrate.

Fluorochemical-containing treatments have been proposed to render substrates resistant to soil and repellent to water- and oil-based stains. For example, WO2007127267 discloses a composition for treating masonry to improve its stain resistance as well as providing water and oil repellency. The composition utilizes a fluorine-containing polymer and at least one silicone compounds selected from silanes and siloxanes. The composition may be dispersed in an organic solvent for application to the masonry substrate followed by elimination of the solvent.

EP 1743910 relates to a treating agent containing a fluoropolymer for use in masonry treatment obtained from (A) a fluoromonomer, (B) a monomer having at least one acid group selected from the group consisting of carboxy, phosphate, phosphonate, phosphinate, sulfate, sulfo, and sulfino groups, and (C) a non-fluorinated monomer containing a hydrophobic group.

EP 1265827 relates to fluoro copolymers containing hydroxyl groups and amino groups in salified or quaternized form. With such a copolymer and a polyisocyanate, an aqueous composition which is useful for the oleophobic and hydrophobic treatment of building materials may be prepared JP2003306391 discloses masonry having water and oil repellency and antifouling properties. The masonry is manufactured by applying a treatment agent containing a fluorine-containing phosphoric acid compound and a surface conditioner.

SUMMARY OF THE INVENTION

Hard surfaces include natural stone, such as granite and marble, and man-made materials, such as concrete, terracotta, grout, etc. Natural and/or man-made stone used in building and outdoor applications are generally vulnerable to soiling. Terrace tiles, for example, can become stained through solid or liquid stains, such as stains made from mud, food and/or beverages. Furthermore, the tiles may lose their original appearance and may gradually deteriorate from exposure to water penetration and weathering. Abrasion from everyday wear can irreversibly damage the tiles surface.

It would be desirable to find an alternative treatment composition for providing porous hard surfaces, in particular natural and man-made stone, with high stain release or stain repellency such that they can be easily and effectively cleaned and/or are less prone to soiling and weathering. Desirably, such treatment is durable, ie the beneficial properties obtained by the treatment aren't easily lost. Further desired properties include good water repellency and/or high oil repellency. Desirably, the treatment provides good repellency properties when applied at room temperature, dries fast and typically does not require curing at elevated temperatures. In particular, it would be desirable to find such treatment that can penetrate well into the porous surface of the stone and is highly effective without changing or undesirably diminishing the aesthetical appeal. Additionally, such coating should typically not cause the surface to be more slippery. Desirably, the composition can be readily manufactured at low cost and can be applied in an easy, convenient and economically feasible way.

The present invention provides in one aspect a composition for treatment, the composition comprising a fluorinated compound and a phosphate ester having at least one hydrocarbon residue having at least 6 carbon atoms.

In a particular aspect, the invention provides a composition comprising a fluorinated compound and a phosphate ester having at least one hydrocarbon residue having at least 6 carbon atoms, wherein said phosphate ester corresponds to the general formula:

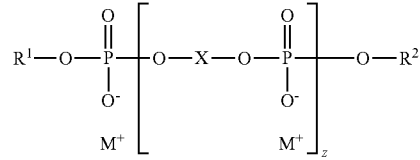

wherein $R^1$ and $R^2$ each independently represent a hydrocarbon group of at least 6 carbon atoms, X represents a hydrocarbon linking group, z has a value of 1 to 5 and M represents a monovalent cation.

In a further aspect, the invention provides a method of treatment wherein a composition comprising a fluorinated compound and a phosphate ester having at least one hydrocarbon residue having at least 6 carbon atoms, is applied to at least part of a surface of a substrate, in particular natural or man-made stone.

In still a further aspect, the invention provides the use of a composition comprising a fluorinated compound and a phosphate ester having at least one hydrocarbon residue having at least 6 carbon atoms, for providing stain release or stain repellence properties to hard surface substrates, in particular natural or man-made stone.

It has been found that hard surface substrates treated with the above described composition typically have high repellency to soiling, and good stain release properties, especially against oil- and water based stains such as common household oil- and water based stains, which are amongst the most severe stains. Stains caused by for example motor oil, cooking oil, food dressings, and beverages, such as wine, coffee, thee and soft drinks can be removed from surfaces treated with the composition, by using tap water and a paper towel, even after the staining substance has been in contact with the substrate for a certain period of time, for example several hours. The compositions generally spread well over the surface of the substrate, with the result that typically uniform properties can be achieved over the whole surface of the substrate. The method is generally environmental friendly and conveniently provides a treatment that has minimal impact on the appearance of the substrate.

SUMMARY OF EMBODIMENTS

Particular embodiments according to the invention can be summarized as follows:

1. Composition for treatment, the composition comprising a fluorinated compound and a phosphate ester having at least one hydrocarbon residue having at least 6 carbon atoms.
2. Composition according to embodiment 1 wherein said fluorinated compound and phosphate ester are dispersed or dissolved in an aqueous medium.
3. Composition according to any of the previous embodiments wherein the phosphate ester has at least one hydrocarbon residue of 10 to 25 carbon atoms.
4. Composition according to any of the previous embodiments wherein said hydrocarbon residue is an aliphatic residue.
5. Composition according to any of the previous embodiments wherein said phosphate ester corresponds to the general formula:

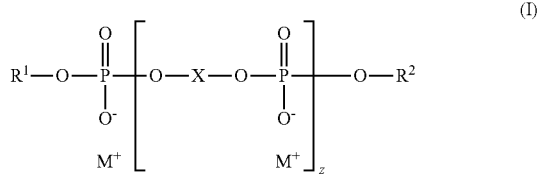

(I)

wherein $R^1$ and $R^2$ each independently represent a hydrocarbon group of at least 6 carbon atoms, X represents a hydrocarbon linking group, z has a value of 1 to 5 and M represents a monovalent cation.
6. Composition according to embodiment 5 wherein $R^1$ and $R^2$ each independently represent an alkyl group of 10 to 25 carbon atoms.
7. Composition according to any of embodiments 1 to 4 wherein said phosphate ester is a salt of a mono- or dialkyl phosphate ester acid wherein the alkyl group or groups each have at least 6 carbon atoms.
8. Composition according to embodiment 7 wherein said alkyl group or groups each have between 10 and 25 carbon atoms.
9. Composition according to any of the previous embodiments further comprising at least one component selected from glycol ether organic solvents, polysiloxanes and ionic or non-ionic surfactants.
10. Composition according to embodiment 2 wherein the amount of solids is between 0.5% and 60%.
11. Composition according to any of the previous embodiments wherein the weight ratio of said fluorinated compound to said phosphate ester is between 90% and 10%
12. Composition according to any of the previous embodiments wherein the fluorinated compound comprises one or more perfluorinated hydrocarbon residues having at least 3 carbon atoms.
13. Composition according to embodiment 12 wherein the perfluorinated hydrocarbon residues have 4 carbon atoms each.
14. Composition according to any of the previous embodiments wherein the fluorinated compound comprises one or more units deriving from a fluorinated monomer of the formula:

wherein $R_f$ represents a partially or fully fluorinated aliphatic group having 3 to 12 carbon atoms, Q represents a covalent bond or a non-fluorinated organic linking group, and E represents a free radical polymerizable group.
15. Composition according to embodiment 14 wherein the fluorinated compound comprises an oligomeric residue of the formula:

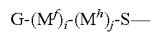

wherein G represents H or a residue of a free radical initiator, $M^f$ represents a unit deriving from a fluorinated monomer, $M^h$ represents a unit of a non-fluorinated monomer, i has a value of 1 to 20 and j has a value of 0 to 20 with the proviso that the sum of i+j is at least 2.
16. Composition according to any of embodiments 1 to 12 wherein the fluorinated compound corresponds to one of the following formulas:

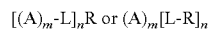

wherein m is a value of 1 to 4, n is a value of 1 to 4, L represents a linking group, R is an aliphatic group and A is a fluorinated residue of the formula:

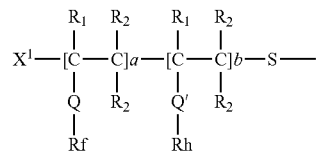

wherein a has a value of 1 to 100, b has a value of 0 to 100 with the sum of a and b being at least 2, $R_1$ and $R_2$ each independently represent H or an alkyl group of 1 to 4 carbon atoms, Q and Q' each independently represent a covalent bond or an organic linking group, Rf represents a fluoroaliphatic group, Rh represents a non-fluorinated group and $X^1$ is H or the residue of a free radical initiator.
17. Method of treatment wherein a composition according to any of embodiments 1 to 16 is applied to at least part of a surface of a substrate.
18. Method according to embodiment 17 wherein said substrate is natural or man-made stone.
19. Use of a composition according to any of embodiments 1 to 16 for providing stain release or stain repellence properties to natural or man-made stone.
20. Use according to embodiment 19 for providing stain release or stain repellence properties against stains selected from the group of stains caused by oils, food dressings, wine, coffee, thee and soft drinks.

DETAILED DESCRIPTION

The phosphate ester used in the composition has at least one hydrocarbon residue having at least 6 carbon atoms, more suitable at least 10 to 25 carbon atoms. The hydrocarbon residue can contain linear or branched segments that are aliphatic or aromatic. In a typical embodiment, the hydrocarbon residue is a linear or branched aliphatic residue having at least 10 to 25 carbon atoms.

In one embodiment the phosphate ester corresponds to the general formula:

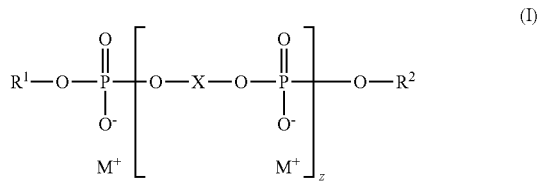

wherein $R^1$ and $R^2$ each independently represent a hydrocarbon group of at least 6 carbon atoms. Typically $R^1$ and $R^2$ represent an alkyl group of 10 to 25 carbon atoms. X represents a hydrocarbon linking group, z has a value of 1 to 5 and M represents a monovalent cation, ammonium ion or an organic ammonium compound.

The hydrocarbon linking group X is a straight or branched, saturated or unsaturated, cyclic, acyclic or aromatic, possibly also heteroatom, containing residue of a diol having 2 to 36 carbon atoms. Phosphate esters according to formula I can be prepared in a three step reaction as is for example described in EP0087799. In a first step, phosphorus oxychloride ($POCl_3$) is reacted with a diol, HO—X—OH. Suitable diols include linear or branched, saturated or unsaturated, acyclic or cyclic diols having 2 to 36, preferably 2 to 10 carbon atoms. Examples include 1,4-butanediol, 2,5-hexanediol, 1,6-hexanediol, 1,10-decandiol, 1,4-buten-2-diol or 2,5-hexin-3-diol; cyclic diols, such as 1,4-cyclohexanediol and aromatic diols, such as bisphenol A diol. The molar ratio of phosphorus oxychloride to diol is between 2 to 1 and 1.1 to 1. In a preferred embodiment, the ratio is 1.5 to 1.

This condensation reaction provides an intermediate compound having the following general formula:

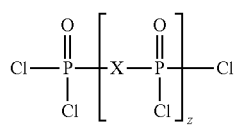

Wherein X is as defined above and z is an integer from 1 to 5.

In a second step, the intermediate compound is reacted with an alcohol, thereby releasing HCl.

Suitable alcohols include linear or branched, saturated or unsaturated alcohols having at least 6 carbon atoms, particularly suitable at least 12 carbon atoms. Examples include oleyl alcohol, tallow fat alcohol, synthetic Alfol alcohols, isooctadecyl alcohol; phenols or alkylphenols with 6-30 C-atoms, such as octylphenol, nonylphenol, dinonylphenol and dodecylphenol.

In a third step remaining P—Cl groups are neutralised with a base M-OH. M represents an alkali metal cation, such as Na+ or K+; an ammonium ion or an organic, cyclic or acyclic ammonium compound, such as cyclohexyl ammonium, tri ethyl ammonium or mono ethanol ammonium compounds.

Phosphate esters according to formula I are commercially available and include OMBRELLON™ WR, OMBRELLON™ WR-N and OMBRELLON™ WR60 (Münzing Chemie GmbH)

In another embodiment, the phosphate ester is a salt of a mono- or dialkyl phosphate ester acid wherein the alkyl group or groups each have at least 6 carbon atoms, suitably between 10 and 25 carbon atoms. Examples include stearyl phosphate ester acid, such as HOSTAPHAT™ CS 120 (a blend of mono- and di-stearyl phosphate ester acids) and HOSTAPHAT™ CC100 (mono-cetyl phosphate ester acid), all commercially available from Clariant.

In one embodiment, the fluorinated compound comprises one or more perfluorinated hydrocarbon residues having at least 3 carbon atoms. In a typical embodiment, the perfluorinated hydrocarbon residues have 4 to 6 carbon atoms each.

In one embodiment, the fluorinated compound comprises one or more units deriving from a fluorinated monomer of the formula:

$R_f$-Q-E wherein $R_f$ represents a partially or fully fluorinated aliphatic group having 3 to 12 carbon atoms, Q represents a covalent bond or a typically non-fluorinated organic linking group and E represents a free radical polymerizable group.

With "free radical polymerizable group" is meant a group capable of undergoing a free radical reaction when exposed to radicals generated by decomposition of a suitable initiator by heat and/or radiation. Suitable groups include, for example moieties derived from vinyl ethers, vinyl esters, allyl esters, vinyl ketones, styrene, vinyl amide, acrylamides, maleates, fumarates, acrylates and methacrylates. Of these groups vinylether, vinylester, acrylates and methacrylates are preferred.

The fluorinated aliphatic group $R_f$, in the fluorinated monomer, is a partially or fully fluorinated, preferably saturated, non-polar, monovalent aliphatic radical. It can be straight chain, branched chain, or cyclic or combinations thereof. It can contain heteroatoms such as oxygen, divalent or hexavalent sulfur, or nitrogen. $R_f$ is preferably a fully-fluorinated radical, but hydrogen or chlorine atoms can be present as substituents if not more than one atom of either is present for every two carbon atoms. The $R_f$ radical has at least 3 carbon atoms, typically at least 3 and up to 12 carbon atoms, suitably 3 to 10, especially suitable 4 to 6 carbon atoms.

The linking group Q links the fluoroaliphatic group $R_f$ to the ethylenically unsaturated group E and can be a covalent bond or generally a non-fluorinated organic linking group. The linking group Q may be a hydrocarbon group which may optionally be substituted and which generally contains from 1 to about 20 carbon atoms. Linking group Q may optionally contain oxygen, nitrogen, or sulfur-containing groups or a combination thereof, but Q should typically be free of functional groups that substantially interfere with free-radical polymerization (e.g., polymerizable olefinic double bonds, thiols, and other such functionality known to those skilled in the art). Examples of suitable linking groups Q include straight chain, branched chain or cyclic alkylene, arylene or aralkylene groups, sulfonyl, sulfoxy, sulfonamido, carbonamido, carbonyloxy, urethanylene, ureylene, oxy, and combinations thereof such as sulfonamidoalkylene.

In one particular embodiment the fluorinated monomer can be represented by the general formula $R_f$-Q-C($R_1$)=C($R_2$)$_2$     (II)

wherein $R_f$ represents a fluorinated aliphatic group having 3 to 12 carbon atoms as defined above, Q is a covalent bond or an organic linking group as defined above; $R_1$ represents hydrogen, halogen or a lower alkyl group having 1 to 4 carbon atoms and each $R_2$ is independently hydrogen or a straight chain or branched chain alkyl of 1 to 4 carbon atoms.

Examples of useful fluorinated monomers include:
$CF_3CF_2CF_2CF_2CH_2CH_2OCOCR_3=CH_2$
$CF_3(CF_2)_3CH_2OCOCR_3=CH_2$
$CF_3(CF_2)_3SO_2N(CH_3)CH_2CH_2OCOCR_3=CH_2$
$CF_3(CF_2)_3SO_2N(C_2H_5)CH_2CH_2OCOCR_3=CH_2$
$CF_3(CF_2)_3SO_2N(CH_3)CH_2CH(CH_3)OCOCR_3=CH_2$
$(CF_3)_2CFCF_2SO_2N(CH_3)CH_2CH_2OCOCR_3=CH_2$
$CF_3CF_2(CF_2CF_2)_2CH_2CH_2OCOCH=CH_2$
wherein $R_3$ is hydrogen, methyl or n-butyl.

In a further embodiment of the invention the fluorinated compound comprises an oligomeric residue of the formula:

$$G\text{-}(M^f)_i\text{-}(M^h)_j\text{-}S\text{---} \qquad (III)$$

wherein G represents H or a residue of a free radical initiator, $M^f$ represents a unit deriving from a fluorinated monomer, $M^h$ represents a unit of a non-fluorinated monomer, i has a value of 1 to 20 and j has a value of 0 to 20 with the proviso that the sum of i+j is at least 2.

The terms 'oligomer' or 'oligomeric' when used herein designate a residue comprising a plurality of polymerized units, generally from 2 to 25 units, typically from 3 to 10 or from 4 to 8 units. The units $M^f$ of the fluorinated compound are generally derived from one or more fluorinated monomers. Examples of fluorinated monomers include those that can be represented by the formula II and as described above.

The units $M^h$ of the oligomeric residue (when present) are generally derived from a non-fluorinated monomer, preferably a monomer consisting of a free radical polymerizable group and a hydrocarbon moiety. Hydrocarbon group containing monomers are well known and generally commercially available. Examples of non-fluorinated monomers from which units $M^h$ can be derived include general classes of ethylenic compounds capable of free-radical polymerization, such as, for example, allyl esters such as allyl acetate and allyl heptanoate; alkyl vinyl ethers or alkyl allyl ethers such as cetyl vinyl ether, dodecylvinyl ether, 2-chloroethylvinyl ether, ethylvinyl ether; unsaturated acids such as acrylic acid, methacrylic acid, alpha-chloro acrylic acid, crotonic acid, maleic acid, fumaric acid, itaconic acid and their anhydrides and their esters such as vinyl, allyl, methyl, butyl, isobutyl, hexyl, heptyl, 2-ethylhexyl, cyclohexyl, lauryl, stearyl, isobornyl or alkoxy ethyl acrylates and methacrylates; alpha-beta unsaturated nitriles such as acrylonitrile, methacrylonitrile, 2-chloroacrylonitrile, 2-cyanoethyl acrylate, alkyl cyanoacrylates; alpha,beta-unsaturated carboxylic acid derivatives such as allyl alcohol, allyl glycolate, acrylamide, methacrylamide, n-diisopropyl acrylamide, diacetoneacrylamide, N,N-diethylaminoethylmethacrylate, N-t-butylamino ethyl methacrylate; styrene and its derivatives such as vinyltoluene, alpha-methylstyrene, alpha-cyanomethyl styrene; lower olefinic hydrocarbons which can contain halogen such as ethylene, propylene, isobutene, 3-chloro-1-isobutene, butadiene, isoprene, chloro and dichlorobutadiene and 2,5-dimethyl-1,5-hexadiene, and allyl or vinyl halides such as vinyl and vinylidene chloride. Preferred non-fluorinated monomers include hydrocarbon group containing monomers such as those selected from octadecylmethacrylate, laurylmethacrylate, butylacrylate, N-methylol acrylamide, isobutylmethacrylate, ethylhexyl acrylate and ethylhexyl methacrylate; and vinylchloride and vinylidene chloride.

In a typical embodiment the non-fluorinated monomer can be represented by the formula:

$$R_h\text{-}Q'\text{-}C(R^3)=C(R^4)_2 \qquad (IV)$$

wherein $R_h$ represents a non-fluorinated group, Q' is a covalent bond or an organic linking group as defined for Q above; $R^3$ represents hydrogen or a lower alkyl group having 1 to 4 carbon atoms and each $R^4$ is independently hydrogen or a straight chain or branched chain alkyl of 1 to 4 carbon atoms.

The oligomeric residue according to formula III can be derived from an oligomer that can be prepared by a free-radical polymerization of fluorinated and optionally non-fluorinated monomers. The polymerization is typically carried out in the presence of a free radical initiator. Such free radical initiators are known in the art and include azo compounds, such as azobisisobutyronitrile (AIBN) and azobis(2-cyanovaleric acid), hydroperoxides such as cumene, t-butyl, and t-amyl hydroperoxide, dialkyl peroxides such as di-t-butyl and dicumylperoxide, peroxyesters such as t-butylperbenzoate and di-t-butylperoxy phtalate, diacylperoxides such as benzoyl peroxide and lauroyl peroxide.

The free radical polymerization can be carried out in any solvent suitable for organic free-radical reactions. The reactants can be present in the solvent at any suitable concentration, e.g., from about 5 percent to about 90 percent by weight based on the total weight of the reaction mixture. Examples of suitable solvents include aliphatic and alicyclic hydrocarbons (e.g., hexane, heptane, cyclohexane), aromatic solvents (e.g., toluene), ethers (e.g., diethylether, glyme, diglyme, diisopropyl ether), esters (e.g., ethyl acetate, butyl acetate), ketones (e.g., acetone, methyl ethyl ketone, methyl isobutyl ketone), amides (e.g., N,N-dimethylformamide, N,N-dimethylacetamide), halogenated solvents such as $C_4F_9OCH_3$ or trifluorotoluene, and mixtures thereof. Particularly suitable solvents include ethylacetate, methylethyl ketone and acetone.

The polymerization can be carried out at any temperature suitable for conducting an organic free-radical reaction. Particular temperature and solvents for use can be easily selected by those skilled in the art based on considerations such as the solubility of reagents and the temperature required for the use of a particular initiator. While it is not practical to enumerate a particular temperature suitable for all initiators and all solvents, generally suitable temperatures are between about 30° C. and about 200° C.

The polymerization to form the oligomer is typically done in the presence of a mercapto functional chain transfer agent. Suitable chain transfer agents can be represented by the formula $R'(SH)_m$, wherein R' represents an hydrocarbon group, optionally comprising a functional group, and m is 1 to 4.

In one embodiment, the hydrocarbon group may be an alkyl group having 1 to 54 carbon atoms, preferably 2 to 36 carbon atoms. Examples of such chain transfer agents include n-octyl mercaptan, octadecyl mercaptan and dodecyl mercaptan. In a further embodiment, the chain transfer agent comprises a functional group. Examples of chain transfer agents having a functional group include 2-mercaptoethanol, 3-mercapto-1,2-propanediol, 4-mercaptobutanol, 11-mercaptoundecanol, mercaptoacetic acid, 3-mercaptopropionic acid, 12-mercaptododecanoic acid, 2-mercaptoethylaamine, 1-chloro-6-mercapto-4-oxahexan-2-ol, 2,3-dimercaptosuccinic acid, 2,3-dimercaptopropanol, 3-mercaptopropyltrimethoxysilane, 2-chloroethanethiol, 2-amino-3-mercaptopropionic acid, methyl 3-mercaptopropionate, mercaptoacetic acid, 2-mercaptobenzimidazole, 2-mercaptobenzoic acid, 2-mercaptobenzothiazole, 2-mercaptobenzoxazole, 3-mercapto-2-butanol, 2-mercaptosulfonic acid, 2-mercaptonicotinic acid, 4-hydroxythiopheno3-mercapto-1,2-propanediol, 1-mercapto-2-propanol, 2-mercaptopropionic acid, N-(2-mercaptopropionyl)glycine, 3-mercaptopropyltrimethoxysilane, 2-mercaptopyridine, 2-mercaptopyridine-N-oxide, 2-mercaptopyridinol, mercaptosuccinic acid, 2,3-mercaptopropanesulfonic acid, 2,3-dimercaptopropanol, 2,3-dimercaptosuccinic acid, cystine, cystine hydrochloride, cystine ethylester. Also suitable are chain transfer agents bearing a functional group that are reacted with one or more compound having a functional group. Examples include for example adducts of 2-mercaptoethylamine and caprolactam and adducts of stearyl dimerdiol with mercaptopropionic acid.

A single chain transfer agent or a mixture of different chain transfer agents may be used. A chain transfer agent is typically present in an amount sufficient to control the number of polymerized monomer units in the oligomer and to obtain the desired molecular weight of the oligomer. The chain transfer agent is generally used in an amount of 0.05 to 0.5 equivalents, suitably 0.1 to 0.4 equivalents, per equivalent of monomer including fluorinated and non-fluorinated monomers.

When the chain transfer agent bears a functional group, the oligomer made in the presence thereof has a functional group that may be further reacted with a compound having another functional group. The nature of the functional groups on both the oligomer and the compounds are chosen so that they are reactive toward one another. Examples of mutually reactive pairs include an acyl group (such as a carboxylic acid, acyl halide or ester) reacting with an alcohol or amine, an alcohol or an amine reacting with a 'leaving group' such as a halide or tosylate, and an isocyanate reacting with an isocyanate reactive group. With the term 'isocyanate reactive group' in connection with the invention is meant a functional group that will react with an isocyanate group under typical reactive conditions for reacting an isocyanate group. Typical reactive conditions include reacting at a temperature of 20 to 150° C., for example 30 to 120° C. and typically involve the use of a catalyst. Generally, an isocyanate reactive group includes at least one Zerewittenoff hydrogen. Though not intended to be limiting, examples of isocyanate reactive groups include: alcohols, amines, thiols and carboxylic acids and derivatives thereof. Useful isocyanate reactive groups include for example —OH, —NH— or —NH$_2$ and —SH, —CO$_2$R$^3$, where R$^3$ is hydrogen or hydroxyalkyl, —C(O)N(R$^1$)(R$^2$), where R$^1$ and R$^2$ are independently hydrogen, hydroxyalkyl or polyalkylenepolyamine. Particularly useful isocyanate reactive groups include —OH, —NH— and —NH$_2$ groups.

In one embodiment, the fluorinated compound can be derived from a fluorinated oligomer having an isocyanate reactive group, an isocyanate and optionally an aliphatic compound having an isocyanate reactive group.

Suitable isocyanates include mono isocyanates and polyisocyanates. Examples of monoisocyanates include octadecylisocyanate, butyl isocyanate, hexyl isocyanate, phenyl isocyanate, benzyl isocyanate, naphtyl isocyanate and mixtures thereof. Examples of polyisocyanates include aliphatic and aromatic isocyanates having 2, 3 or 4 isocyanate groups and mixtures thereof. Examples of aliphatic diisocyanates include hexamethylenediisocyanate, 2,2,4-trimethyl-1,6-hexamethylenediisocyanate, and 1,2-ethylenediisocyanate, dicyclohexylmethane-4,4'-diisocyanate and 3-isocyanatomethyl-3,5,5-trimethylcyclohexylisocyanate (isophorone diisocyanate IPDI). Examples of aliphatic triisocyanates include 1,3,6-hexamethylenetriisocyanate, cyclic trimer of hexamethylenediisocyanate and cyclic trimer of isophorone diisocyanate (isocyanurates). Examples of aromatic diisocyanates include 4,4'-methylenediphenylenediisocyanate, 4,6-di-(trifluoromethyl)-1,3-benzene diisocyanate, 2,4-toluenediisocyanate, 2,6-toluene diisocyanate, o, m, and p-xylylene diisocyanate, 4,4'-diisocyanatodiphenylether, 3,3'-dichloro-4,4'-diisocyanatodiphenylmethane, 4,5'-diphenyldiisocyanate, 4,4'-diisocyanatodibenzyl, 3,3'-dimethoxy-4,4'-diisocyanatodiphenyl, 3,3'-dimethyl-4,4'-diisocyanatodiphenyl, 2,2'-dichloro-5,5'-dimethoxy-4,4'-diisocyanato diphenyl, 1,3-diisocyanatobenzene, 1,2-naphthylene diisocyanate, 4-chloro-1,2-naphthylene diisocyanate, 1,3-naphthylene diisocyanate, and 1,8-dinitro-2,7-naphthylene diisocyanate. Exampels of aromatic triisocyanates include polymethylene-polyphenylisocyanate (PAPI).

Also useful are isocyanates containing internal isocyanate-derived moieties such as biuret-containing triisocyanates, such as DESMODUR™ N100 or TOLONATE HDB, commercially available from Bayer or Rhodia respectively; isocyanurate-containing tri-isocyanates, such as IPDI-1890, commercially available from Huls AG; azetedinedione-containing diisocyanates such as DESMODUR™ TT, commercially available from Bayer. Also, other commercially available di- or tri-isocyanates such as DESMODUR™ L and DESMODUR™ W, tri-(4-isocyanatophenyl)-methane (DESMODUR™ R) (all available from Bayer) and DDI 1410 (available from Cognis) are suitable.

The aliphatic compound having an isocyanate reactive group can be represented by the formula R$^3$—(Z)$_q$, where Z is an isocyanate reactive group, such as an amino group, a hydroxy group or a carboxyl group and q is 1 to 4, preferably 1. R$^3$ is a mono- or polyvalent, linear or branched chain, saturated or unsaturated, cyclic or acyclic (or any combination thereof) organic aliphatic group having from 1 to 75 carbon atoms. In certain embodiments R$^3$ may be fluorinated (i.e. R$^3$=Rf). Preferably R$^3$ has 12 to 75 carbon atoms. More preferably R$^3$ is a monovalent alkyl group having from 12 to 75 carbon atoms. Examples of aliphatic compounds having isocyanate reactive group include stearylalcohol, and lauryl alcohol. Particular preferred compound includes stearylalcohol, The fluorinated compound may be prepared by reacting a (poly)isocyanate, the fluorinated oligomeric compound having an isocyanate-reactive terminal group; and the optional aliphatic compound having an isocyanate-reactive group. The reactive components may be combined in one reaction to form the reaction products. In an alternative embodiment, the (poly)isocyanate may be reacted with the fluorinated oligomeric compound, optionally followed by reaction with the aliphatic compound, or the polyisocyanate may be reacted first with the aliphatic compound, followed by reaction with the fluorinated oligomeric compound.

The fluorinated compound can be prepared in the presence of an organic solvent, free of isocyanate reactive groups. Suitable examples include ethylacetate, methylisobutyl ketone, acetone and halogenated solvents such C$_4$F$_9$OCH$_3$ or trifluorotoluene.

When a polyisocyanate is used, the molar ratio of fluorinated oligomeric compound having an isocyanate reactive group to polyisocyanate is generally from 10 to 95% of the available isocyanate groups, with the balance of the isocyanate groups reacted with the aliphatic compound.

It will be understood that a mixture of fluorinated oligomeric compounds will be formed, which is generally a statistical mixture of substitution products on the polyisocyanate. Any remaining isocyanate groups may be reacted or hydrolyzed as desired. In some embodiments it may be desirable to leave some small percentage of the available isocyanate groups unreacted, generally less than 10%, and hydrolyze the remaining. In the presence of a small amount of water, the unreacted isocyanates will react to form urea links between isocyanate residues.

The isocyanate condensation reaction is typically carried out in the presence of a catalyst. Depending on reaction conditions (e.g., reaction temperature and/or polyisocyanate used), a catalyst level of up to about 0.5 percent by weight of the total weight of the reactant mixture may be used, but typically about 0.00005 to about 0.5 percent by weight is required, 0.02 to 0.1 percent by weight being preferred.

Suitable catalysts include, but are not limited to, tertiary amine and tin compounds. Examples of useful tin compounds include tin II and tin IV salts such as stannous octoate, dibutyltin dilaurate, dibutyltin diacetate, dibutyltin di-2-ethylhexanoate, and dibutyltinoxide. Examples of useful tertiary amine compounds include triethylamine, tributylamine, triethylenediamine, tripropylamine, bis(dimethylaminoethyl) ether, morpholine compounds such as ethyl morpholine, and 2,2'-dimorpholinodiethyl ether, 1,4-diazabicyclo[2.2.2]octane (DABCO, Aldrich Chemical Co.), and 1,8-diazabicyclo[5.4.0.]undec-7-ene (DBU, Aldrich Chemical Co.).

In yet a further embodiment, the fluorinated compound corresponds to one of the following formulas:

$$[(A)_m\text{-}L]_nR \qquad \qquad V$$

or $$(A)_m[L\text{-}R]_n \qquad \qquad VI$$

wherein m is a value of 1 to 4, n is a value of 1 to 4, L represents a linking group, R is an aliphatic group and A is a fluorinated residue of the formula:

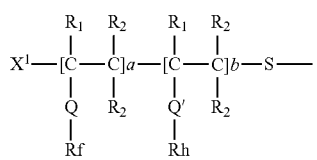

wherein a has a value of 1 to 100, b has a value of 0 to 100 with the sum of a and b being at least 2, $R_1$ and $R_2$ each independently represent H or an alkyl group of 1 to 4 carbon atoms, $R_1$ can also represent a halogen; Q and Q' each independently represent a covalent bond or an organic linking group as defined above, Rf represents a partially or fully fluorinated aliphatic group group and is as defined above, Rh represents a non-fluorinated group and $X^1$ is H or the residue of a free radical initiator.

The fluorinated compounds according to formulas V and VI comprise an alkylated fluorinated compounds having a plurality of pendent Rf groups and generally have three principal portions: at least one fluorinated polymeric portion 'A', a linking group 'L', and at least one aliphatic moiety 'R'.

The fluorinated polymeric portion and the aliphatic moiety R are linked together by linking group L. The linking group may be a covalent bond, may result from a condensation reaction between a nucleophile, such as an alcohol, an amine, or a thiol, and an electrophile such as a carboxylic acid, ester, acyl halide, sulfonate ester, sulfonyl halide, cyanate, isocyanate, or may result from a nucleophilic displacement reaction between a nucleophile and a moiety bearing a leaving group, such as the reaction between an alcohol (or alkoxide) and an alkyl halide (where the halogen atom of the alkyl halide serves as a leaving group).

Examples of suitable linking groups L include a covalent bond, straight chain, branched chain, or cyclic alkylene, arylene, aralkylene, oxy, oxo, hydroxy, thio, sulfonyl, sulfoxy, amino, imino, sulfonamido, carboxamido, carbonyloxy, urethanylene, ureylene, and combinations thereof such as sulfonamidoalkylene.

The aliphatic group R in compounds of Formulas V and VI is a mono-, di-, tri- or tetravalent, linear or branched chain, saturated or unsaturated, cyclic or acyclic (or any combination thereof) organic aliphatic group having at least one, preferably from 12 to 75 carbon atoms. In certain embodiments R may be fluorinated (i.e. R=Rf). The valency is equivalent to the value of n in Formula V and is equal to 1 in Formula VI. Suitably R is a monovalent alkyl group having at least one, preferably from 12 to 75 carbon atoms, most preferably 16 to 60 carbon atoms. Where more than one R group is present, such as in Formula VI, or when n is greater than one in Formula VI, the sum of the carbon atoms in the R groups is preferably from 12 to 100 carbon atoms.

The fluorinated compound of formulas V and VI can be prepared through a free radical polymerization of a fluorinated monomer with optionally a non-fluorinated monomer in the presence of a chain transfer agent. A free radical initiator is generally used to initiate the polymerization reaction. Commonly known free-radical initiators can be used and examples thereof include azo compounds, such as azobisisobutyronitrile (ABIN), azo-2-cyanovaleric acid and the like, hydroperoxides such as cumene, t-butyl and t-amyl hydroperoxide, dialkyl peroxides such as di-t-butyl and dicumylperoxide, peroxyesters such as t-butylperbenzoate and di-t-butylperoxy phthalate, diacylperoxides such as benzoyl peroxide and lauroyl peroxide.

The free radical polymerization can be carried out in any solvent suitable for organic free-radical reactions as described above. The reactants can be present in the solvent at any suitable concentration, e.g., from about 5 percent to about 90 percent by weight based on the total weight of the reaction mixture.

The polymerization can be carried out at any temperature suitable for conducting an organic free-radical reaction. Particular temperature and solvents for use can be easily selected by those skilled in the art based on considerations such as the solubility of reagents, the temperature required for the use of a particular initiator, and the like. While it is not practical to enumerate a particular temperature suitable for all initiators and all solvents, generally suitable temperatures are between about 30° C. and about 200° C.

The fluorochemical polymer is prepared in the presence of a chain transfer agent. Suitable chain transfer agents include those that can be represented by the formula $R'(SH)_m$, as described above, wherein R' represents an hydrocarbon group, optionally comprising a functional group, and m is 1 to 4.

In one embodiment, the hydrocarbon group may be an alkyl group having 1 to 75 carbon atoms, preferably 4 to 36. Examples of such chain transfer agents include n-octyl mercaptan, octadecyl mercaptan and dodecyl mercaptan. When R' represents an alkyl group, the linking group L in formulas V and VI represents a covalent bond.

In another embodiment, the hydrocarbon group includes one or more functional groups.

When the chain transfer agent bears a functional group, the fluorinated polymer made in the presence thereof will have a functional group that may be further reacted with a functional aliphatic compound to form the linking group L and incorporate the R group into the compounds of Formulas V and VI. The nature of the functional groups on both the chain transfer agent and the aliphatic compounds are chosen so that they are reactive toward one another to form the L linking group. Examples of mutually reactive pairs include an acyl group (such as a carboxylic acid, acyl halide or ester) reacting with an alcohol or amine, an alcohol or an amine reacting with a 'leaving group' such as a halide or tosylate, and an isocyanate reacting with an alcohol or amine.

Examples of chain transfer agents having a functional group are as described above.

A single chain transfer agent or a mixture of different chain transfer agents may be used. A chain transfer agent is typically present in an amount sufficient to control the number of polymerized monomer units in the polymer and to obtain the desired molecular weight of the fluorinated polymer. The chain transfer agent is generally used in an amount of 0.05 to 0.5 equivalents, suitably 0.1 to 0.4 equivalents, per equivalent of monomer including fluorinated and non-fluorinated monomers.

In one embodiment the chain transfer agent comprises an isocyanate reactive group and the fluorinated polymer made in the presence therewith will accordingly have the same isocyanate reactive group. In that case, the fluorinated polymer will be prepared in the presence of an organic solvent free of isocyanate reactive groups. Suitable examples include ethylacetate, methylisobutyl ketone, acetone and halogenated solvents such $C_4F_9OCH_3$ or trifluorotoluene.

The fluorinated compound according to formulas V and VI can be prepared from the fluorinated polymer comprising an isocyanate reactive group and an isocyanate and optionally an aliphatic compound having an isocyanate reactive group.

Suitable isocyanates include mono isocyanates and polyisocyanates. Useful mono isocyanates include isocyanates having an aliphatic group. Examples include octadecylisocyanate, butyl isocyanate, hexyl isocyanate. Particularly suitable mono isocyanate is octadecylisocyanate. Useful polyisocyanates include aliphatic and aromatic isocyanates having 2, 3 or 4 isocyanate groups and mixtures thereof. Further useful polyisocyanates include isocyanates containing internal isocyanate-derived moieties. Examples of useful polyisocyanates are as described above.

The aliphatic compound having an isocyanate reactive group can be represented by the formula $R^3—(Z)_q$, and is as described above.

In a particular embodiment, the fluorinated compound according to formulas V and VI can be prepared in a multistep reaction. In a first step, the fluorinated polymer comprising the isocyanate reactive group is prepared as described above. In a second step, in one embodiment the fluorinated polymer is further reacted with a monoisocyanate having an aliphatic group. In an alternative embodiment, the fluorinated polymer having an isocyanate functional group is further reacted with a polyisocyanate and an aliphatic compound having an isocyanate reactive group. The three reactive components may be combined in one reaction to form the reaction products. In an alternative embodiment, the polyisocyanate may first be reacted with the fluorinated polymer, followed by reaction with the aliphatic compound, or the polyisocyanate may first be reacted with the aliphatic compound, followed by reaction with the fluorinated polymer.

When a polyisocyanate is used, the molar ratio of fluorinated oligomeric compound having an isocyanate reactive group to polyisocyanate is generally from 10 to 95% of the available isocyanate groups, with the balance of the isocyanate groups reacted with the aliphatic compound.

It will be understood that a mixture of fluorinated compounds will be formed, which is generally a statistical mixture of substitution products on the polyisocyanate. Any remaining isocyanate groups may be reacted or hydrolyzed as desired. In some embodiments it may be desirable to leave some small percentage of the available isocyanate groups unreacted, generally less than 10%, and hydrolyze the remaining. In the presence of a small amount of water, the unreacted isocyanates will react to form urea links between isocyanate residues.

The isocyanate condensation reaction is typically carried out in the presence of a catalyst. Depending on reaction conditions (e.g., reaction temperature and/or polyisocyanate used), a catalyst level of up to about 0.5 percent by weight of the total weight of the reactant mixture may be used, but typically about 0.00005 to about 0.5 percent by weight is required, 0.02 to 0.1 percent by weight being preferred.

Suitable catalysts include, but are not limited to, tertiary amine and tin compounds. Examples of useful tin compounds include tin II and tin IV salts such as stannous octoate, dibutyltin dilaurate, dibutyltin diacetate, dibutyltin di-2-ethylhexanoate, and dibutyltinoxide. Examples of useful tertiary amine compounds include triethylamine, tributylamine, triethylenediamine, tripropylamine, bis(dimethylaminoethyl) ether, morpholine compounds such as ethyl morpholine, and 2,2'-dimorpholinodiethyl ether, 1,4-diazabicyclo[2.2.2]octane (DABCO, Aldrich Chemical Co.), and 1,8-diazabicyclo [5.4.0.]undec-7-ene (DBU, Aldrich Chemical Co.). With reference to Formulas III and V to VII, it will be understood that the fluorinated compound may have a random distribution of fluorinated and fluorine-free segments, or a sequential arrangement where the fluorinated compound comprises 'blocks' of fluorinated and fluorine-free segments. Further it will be understood that the relative position of the units derived from fluorinated monomers and fluorine-free monomers may vary with respect to the G, Y and S moieties.

Fluorinated compounds useful in the composition according to the invention have been disclosed for example in U.S. Pat. No. 7,049,379 and U.S. Pat. No. 7,078,456.

The treatment composition according to the invention typically comprises a fluorinated compound and a phosphate ester in a weight ratio between 90 to 10 and 10 to 90. Typical weight ratio of fluorinated compound to the phosphate ester is 80 to 20 and 20 to 80.

The treatment composition is typically used as an aqueous composition, in particular an aqueous dispersion in water. To prepare the aqueous dispersion, the fluorinated compound together with the phosphate ester having at least one hydrocarbon residue having at least 6 carbon atoms, and optional additives are vigorously dispersed in water, in the presence of ionic or non-ionic surfactants. If the fluorinated compound is made by solution polymerization, preferably the composition in solvent will be turned into an aqueous dispersion by adding water and subjecting the composition to vigorous stirring in the presence of a surfactant. Typically the mixture is then subjected to an ultrasonic treatment or a treatment in a high pressure homogenizer.

Generally the aqueous dispersion as a concentrate contains up to 60% by weight of an active composition (fluorinated compound and phosphate ester), 0.5 to 15% by weight of one or more surfactants, and 0 to 30% by weight of a solvent or solvent mixture, the remainder being water. Solvents useful in the preparation of the aqueous dispersion include mixtures of water-insoluble solvents with water-soluble solvents, the amount of the water-insoluble solvent in most cases being greater than the water-soluble solvent. Suitable water-soluble solvents are, for example, mono- or di-alcohols, lower ketones, (poly)glycol esters, and (poly)glycol ethers, or mixtures of such solvents. Examples of water-insoluble solvents include esters, ethers, and higher ketones. Preferred water-insoluble solvents include esters or ketones, such as ethyl acetate, butyl acetate, and methyl ethyl ketone. Preferred water-soluble solvents include glycol ether solvents. Aqueous dispersions that are typically free of or essentially free of organic solvent, eg less than 5% by weight of organic solvent, can be prepared by subsequently removing the solvent by distillation. Useful treatment compositions comprise the active composition in an amount between 0.5% and 60% by weight, typically between 3% and 40%.

In order to increase repellency properties and the durability thereof and to aid in the application of the aqueous composition to the hard surface to be treated therewith, it may be advantageous to incorporate into the aqueous composition, one or more further components. Examples include coalescing agents such as e.g. Dowanol™ DPnB, commercially available from Dow Chemicals, silanes and/or polysiloxanes, such as Baysilone™ WA, commercially available from Momentive, SILRES BS1001 and SILRES BS 2002, commercially available from Wacker Chemie, GmbH.

The composition according to the invention can be used to treat the surface of a substrate, in particular a hard surface such as that of natural stone, such as granite and marble, and man-made stone, such as concrete, terracotta and grout.

The hard surfaces can be treated with an aqueous dispersion comprising the fluorinated compound and the phosphate ester, using a variety of techniques, including spray application or brush application, immersion and roll coating. The treatment composition can be applied as a single layer or as two or more superimposed layers. The amount of the treatment composition applied to the hard surface in accordance with this invention is chosen so that sufficiently high or desirable stain release or stain repellence is imparted to the substrate. The amount which is sufficient to impair desired repellency can be determined empirically and can be increased as necessary or desired. The substrate to be coated can typically be contacted with the treating composition at room temperature (typically, about 10 to 45° C.)

The treated substrates can conveniently be dried at room temperature for a time sufficient to dry, eg 10 minutes to 1 hour.

EXAMPLES

The following examples further illustrate the invention without the intention however to limit the invention thereto. All parts are by weight unless indicated otherwise.

Abbreviations

| Abbreviations | Product | Availability |
| --- | --- | --- |
| FC-1 | PM5000 Low Molecular weight FC acrylate aqueous dispersion at 30% | 3M |
| DPnB | Dowanol ™ DPnB: Coalescing agent | Dow Chemicals |
| PHOS 1 | Ombrellon ™ WR: Phosphate ester salt dispersion | Munzing Chemie |
| PHOS 2 | Hostaphat ™ CS120: Blend of mono- and di stearylphosphate ester acid | Clariant |
| PHOS 3 | Hostaphat ™ CC 100: Mono cetyl phosphate ester acid | Clariant |

Methods of Application and Testing

Treatment mixtures were applied to 10×10 cm test samples of natural stones and/or man made stones as given in table 1 below by brush application until saturation. Excess treatment mixture was removed after 15 minutes using a dry paper towel. The treated stones were conditioned for 1 week at room temperature before testing.

TABLE 1

| Test material | Type | Name | Available from |
| --- | --- | --- | --- |
| Test 1 | Marble | Blanc Carrara C | Brachot Hermant, Belgium |
| Test 2 | Granite | Kasmir White Polished | Brachot Hermant, Belgium |
| Test 3 | Granite | Shivakashi Yellow Anciento | Brachot Hermant, Belgium |
| Test 4 | Porous sand stone | Combe Brune | Brachot Hermant, Belgium |
| Test 5 | Sweetened sand stone | Belgium Blue Stone, sweetened | Brachot Hermant, Belgium |
| Test 6 | Concrete tiles, sandblasted | | Coeck, Belgium |
| Test 7 | Terracotta Tiles | | Rairies Montrieux, France |
| Test 8 | Red concrete tiles, sandblasted | | Kronimus, Germany |

The treated substrates were tested for stain resistance, oil repellency (OR) and water/IPA repellency (WR).

Respective data of stain repellency, water and oil repellency shown in the Examples and Comparative Examples were based on the following methods of measurement and evaluation criteria:

Stain Repellency Test (SR)

The stain resistance test was performed using oil and water based stains:

Olive Oil (Bertoli)

Motor Oil (15W40)

Mayonnaise (Devos Lemmens)

Expresso coffee (Douwe Egberts)

Red wine (Vin de Table Rouge, Le Tonnelier, France)

Coca Cola®

Staining of the test samples was done by putting 10 drops of the oil and/or water based stains on 10 cm×10 cm test samples. The stain was left on the substrate for 24 hours. The substrates were then cleaned with a paper towel to blot away the staining substance, followed by cleaning the samples with tap water and a paper towel until no further residue could be removed. After drying the degree of staining was visually evaluated giving a rating between 1 and 8. A stain rating of 8 meant that the stain could completely be removed. A rating of 1 was given for a stain that could not be removed at all.

Oil Repellency (OR)

The oil repellency of a substrate was measured by the American Association of Textile Chemists and Colorists (AATCC) Standard Test Method No. 118-1983, which test was based on the resistance of a substrate to penetration by oils of varying surface tensions. Treated substrates resistant only to Nujol® mineral oil (the least penetrating of the test oils) were given a rating of 1, whereas treated substrates resistant to heptane (the most penetrating of the test liquids) were given a rating of 8. Other intermediate values were determined by use of other pure oils or mixtures of oils, as shown in the following table.

| AATCC Oil Repellency Rating Number | Compositions |
| --- | --- |
| 1 | Nujol ® |
| 2 | Nujol ®/n-Hexadecane 65/35 |
| 3 | n-Hexadecane |
| 4 | n-Tetradecane |
| 5 | n-Dodecane |
| 6 | n-Decane |
| 7 | n-Octane |
| 8 | n-Heptane |

Standard Test Liquids

Water/IPA Repellency Test (WR)

The water repellency (WR) of a substrate was measured using a series of water-isopropyl alcohol test liquids and was expressed in terms of the 'WR' rating of the treated substrate. The WR rating corresponds to the most penetrating test liquid which does not penetrate or wet the substrate surface after 15 seconds exposure. Substrates which are penetrated by or are resistant only to 100% water (0% isopropyl alcohol), the least penetrating test liquid, were given a rating of 0, whereas substrates resistant to 100% isopropyl alcohol (0% water), the most penetrating test liquid, were given a rating of 10. Other intermediate ratings were calculated by dividing the percent isopropylalcohol in the test liquid by 10, e.g., a treated substrate resistant to a 70%/30% isopropyl alcohol/water blend, but not to an 80%/20% blend, would be given a rating of 7.

Example 1 and Reference Example Ref-1

In example 1, a blend containing 3% (on solids) fluorinated compound and 2% (on solids) phosphate ester salt was made by first diluting 10 g FC-1 with 86 g DIW. 4 g PHOS 1 was mixed with the fluorinated compound. A reference example containing 3% fluorinated compound was made by diluting 10 g FC-1 with 90 g DIW. The treatment mixtures were brush applied to the natural stones and man made stones represented in table 1. The treated samples were tested for stain repellency, OR and WR. The results presented in table 2 are an average of the test results of all the treated substrates. "Av oil" and "Av water" represents the average of test results obtained with oily stains and with water based stains respectively.

TABLE 2

| Ex | OR | WR | Olive oil | Motor Oil | Mayo | Coffee | Wine | Coca Cola ® | Av Oil | Av Water |
| --- | --- | --- | --- | --- | --- | --- | --- | --- | --- | --- |
| 1 | 4.7 | 5.1 | 6.6 | 6.1 | 6.9 | 6.4 | 4.7 | 5.9 | 6.5 | 5.7 |
| Ref-1 | 2.6 | 2.1 | 4.1 | 4.6 | 5.9 | 4.9 | 4.1 | 5.0 | 4.9 | 4.7 |

Example 2 and Reference Example Ref-2

In example 2, a blend was made by first diluting 10 g FC-1 with 81 g DIW. 5 g Dowanol DPnB and 4 g PHOS 1 was mixed in. The treating composition contained 3% solids fluorinated compound and 2% solids phosphate ester salt. A reference example was made by diluting 10 g FC-1 with 85 g DIW and 5 g Dowanol DPnB. The reference example contained 3% solids fluorinated compound. The substrates given in table 1 were treated by brush application as given in the general procedure. The treated samples were tested for stain repellency, OR and WR. The results presented in table 3 are an average of the test results of all the treated substrates.

TABLE 3

| Ex | OR | WR | Olive oil | Motor Oil | Mayo | Coffee | Wine | Coca Cola ® | Av Oil | Av Water |
| --- | --- | --- | --- | --- | --- | --- | --- | --- | --- | --- |
| 2 | 6.1 | 7.7 | 7.7 | 6.6 | 7.3 | 8.0 | 7.1 | 7.7 | 7.2 | 7.6 |
| Ref-2 | 4.1 | 5.7 | 6.7 | 6.1 | 6.6 | 8.0 | 5.3 | 7.0 | 6.5 | 6.8 |

Examples 3 to 6 and Reference Examples Ref-3 and Ref-4

In examples 3 to 6, treating compositions were made with the components as given in table 4. In a first step, a mixture of Dowanol™ DPnB with water and phosphate esters was heated to 60° C. A base was added to adjust the pH to 10. The mixtures were cooled to room temperature after which FC-1 was added. Reference example Ref-3 was made without fluorinated compound. Reference example Ref-4 was made without phosphate ester. The compositions of the examples and the reference examples were applied to test substrate 6 by brush application as given in the general procedure. The treated samples were tested for stain repellency, OR and WR. The test results are represented in table 4.

TABLE 4

| Ex | Composition (water added to 100%) | OR | WR | Olive oil | Red wine |
| --- | --- | --- | --- | --- | --- |
| 3 | 10% FC-1 + 5% DPnB + 1.5% PHOS 2 0.5% NH$_4$OH (32%) | 7 | 9 | 7.5 | 8 |
| 4 | 10% FC-1 + 5% DPnB + 1.5% PHOS 3 0.,5% NH$_4$OH (32%) | 7 | 10 | 7.5 | 7 |
| 5 | 10% FC-1 + 5% DPnB + 1.5% PHOS 2 >1% NaOH (20%) | 7 | 8 | 7.5 | 7 |
| 6 | 10% FC-1 + 5% DPnB + 1.5% PHOS 3 >1% NaOH (20%) | 7 | 8 | 7.5 | 7 |
| Ref-3 | 5% DPnB + 3% PHOS 2 + 1% NH$_4$OH (32%) | 0 | 2 | 2 | 5 |
| Ref-4 | 10% FC-1 + 5% DPnB | 6 | 6 | 7 | 5 |

The invention claimed is:

1. A method of treating a substrate, comprising applying a composition to at least part of a hard surface of a substrate, wherein the composition comprises a fluorinated compound and a phosphate ester;

wherein the fluorinated compound corresponds to one of the following formulas:

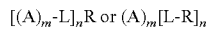
[(A)$_m$-L]$_n$R or (A)$_m$[L-R]$_n$ wherein m is a value of 1 to 4, n is a value of 1 to 4, L represents a linking group, R is an aliphatic group and A is a fluorinated residue of the formula:

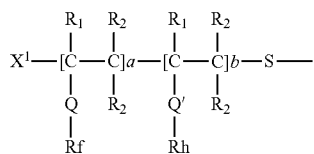

wherein a has a value of 1 to 100, b has a value of 0 to 100 with the sum of a and b being at least 2, $R_1$ and $R_2$ each independently represent H or an alkyl group of 1 to 4 carbon atoms, Q and Q' each independently represent a covalent bond or an organic linking group, Rf represents a fluoroaliphatic group, Rh represents a non-fluorinated group and $X^1$ is H or the residue of a free radical initiator;

wherein the phosphate ester corresponds to the general formula:

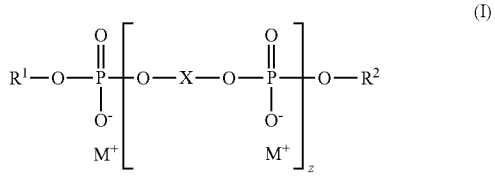

(I)

wherein $R^1$ and $R^2$ each independently represent a hydrocarbon group of at least 6 carbon atoms, X represents a hydrocarbon linking group, z has a value of 1 to 5 and M represents a monovalent cation; and wherein the hard surface of the substrate is natural or man-made stone.

2. The method according to claim 1 wherein said fluorinated compound and phosphate ester are dispersed or dissolved in an aqueous medium.

3. The method according to claim 1 wherein said phosphate ester is a salt of a mono- or dialkyl phosphate ester acid wherein the alkyl group or groups each have at least 6 carbon atoms.

4. The method according to according to claim 1 wherein the amount of solids in the composition is between 0.5% and 60%.

5. The method according to according to claim 1 wherein the weight ratio of said fluorinated compound to said phosphate ester is between 90% and 10%.

6. The method according to according to claim 1 wherein the fluorinated compound comprises one or more perfluorinated hydrocarbon residues having at least 3 carbon atoms.

7. The method according to claim 6 wherein the perfluorinated hydrocarbon residues have 4 carbon atoms each.

8. The method according to claim 1 wherein the fluorinated compound comprises an oligomeric residue of the formula:

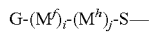
G-(M$^f$)$_i$-(M$^h$)$_j$-S— wherein G represents H or a residue of a free radical initiator, M$^f$ represents a unit deriving from a fluorinated monomer, M$^h$ represents a unit of a non-fluorinated monomer, i has a value of 1 to 20 and j has a value of 0 to 20 with the proviso that the sum of i+j is at least 2.

9. The method according to claim 1 wherein the composition provides stain release or stain repellence properties to the natural or man-made stone.

10. The method according to claim 9 wherein the stain release or stain repellence properties are against stains selected from the group of stains caused by oils, food dressings, wine, coffee, tea, and soft drinks.

11. A method of treating at least part of a hard surface of a natural or man-made stone substrate, comprising applying a composition to at least part of a surface of the substrate, wherein the composition comprises a fluorinated compound and a phosphate ester having the general formula:

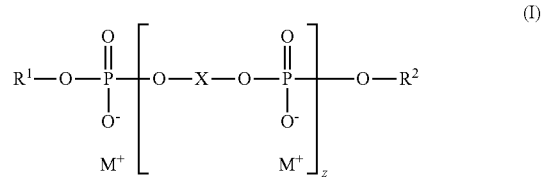

(I)

wherein $R^1$ and $R^2$ each independently represent a hydrocarbon group of at least 6 carbon atoms, X represents a hydrocarbon linking group, z has a value of 1 to 5 and M represents a monovalent cation; and wherein the fluorinated compound corresponds to one of the following formulas:

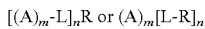
[(A)$_m$-L]$_n$R or (A)$_m$[L-R]$_n$ wherein m is a value of 1 to 4, n is a value of 1 to 4, L represents a linking group, R is an aliphatic group and A is a fluorinated residue of the formula:

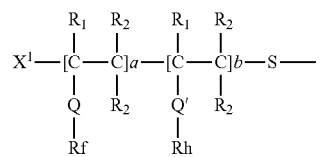

wherein a has a value of 1 to 100, b has a value of 0 to 100 with the sum of a and b being at least 2, $R_1$ and $R_2$ each independently represent H or an alkyl group of 1 to 4 carbon atoms, Q and Q' each independently represent a covalent bond or an organic linking group, Rf represents a fluoroaliphatic group, Rh represents a non-fluorinated group and $X^1$ is H or the residue of a free radical initiator.

12. The method according to claim 11 wherein the fluorinated compound comprises an oligomeric residue of the formula:

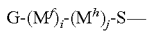
G-(M$^f$)$_i$-(M$^h$)$_j$-S— wherein G represents H or a residue of a free radical initiator, M$^f$ represents a unit deriving from a fluorinated monomer, M$^h$ represents a unit of a non-fluorinated monomer, i has a value of 1 to 20 and j has a value of 0 to 20 with the proviso that the sum of i+j is at least 2.

13. A method of treating at least part of a hard surface of a natural or man-made stone substrate, comprising applying a composition to at least part of the hard surface of the substrate, wherein the composition comprises a fluorinated compound and a phosphate ester having the general formula:

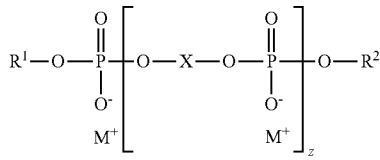  (I)

wherein $R^1$ and $R^2$ each independently represent a hydrocarbon group of at least 6 carbon atoms, X represents a hydrocarbon linking group, z has a value of 1 to 5 and M represents a monovalent cation; and;

wherein the fluorinated compound corresponds to one of the following formulas:

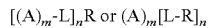

wherein m is a value of 1 to 4, n is a value of 1 to 4, L represents a linking group, R is an aliphatic group and A is a fluorinated residue of the formula:

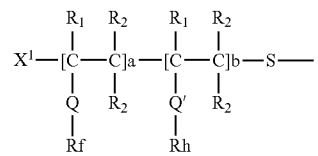

wherein a has a value of 1 to 100, b has a value of 0 to 100 with the sum of a and b being at least 2, $R_1$ and $R_2$ each independently represent H or an alkyl group of 1 to 4 carbon atoms, Q and Q' each independently represent a covalent bond or an organic linking group, Rf represents a fluoroaliphatic group, Rh represents a non-fluorinated group and $X^1$ is H or the residue of a free radical initiator, and wherein the fluorinated compound comprises an oligomeric residue of the formula:

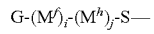

wherein G represents H or a residue of a free radical initiator, $M^f$ represents a unit deriving from a fluorinated monomer, $M^h$ represents a unit of a non-fluorinated monomer, i has a value of 1 to 20 and j has a value of 0 to 20 with the proviso that the sum of i+j is at least 2.

* * * * *